United States Patent
Perdices-Gonzalez et al.

(10) Patent No.: US 10,845,600 B2
(45) Date of Patent: Nov. 24, 2020

(54) CONTROLLABLE MODIFIABLE SHADER LAYER FOR HEAD MOUNTABLE DISPLAY

(71) Applicant: Samsung Electronics Co., Ltd., Suwon-si (KR)

(72) Inventors: Sergio Perdices-Gonzalez, Sunnyvale, CA (US); Mohammad J. Abu Saude, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/182,161

(22) Filed: Nov. 6, 2018

(65) Prior Publication Data

US 2019/0324273 A1    Oct. 24, 2019

Related U.S. Application Data

(60) Provisional application No. 62/662,139, filed on Apr. 24, 2018.

(51) Int. Cl.
  *G02B 27/01*  (2006.01)
  *G02F 1/1334* (2006.01)
  *G02F 1/1343* (2006.01)

(52) U.S. Cl.
  CPC ....... *G02B 27/0172* (2013.01); *G02F 1/1334* (2013.01); *G02F 1/134363* (2013.01);
  (Continued)

(58) Field of Classification Search
  CPC ...... G02B 2027/0118; G02B 2027/014; G02B 2027/0196; G02B 27/0172; G02F 1/1334; G02F 1/134363
  See application file for complete search history.

(56) References Cited

U.S. PATENT DOCUMENTS

| 8,508,830 B1 | 8/2013 | Wang |
| 8,980,383 B2 * | 3/2015 | Coles ................... C09K 19/406 252/299.5 |

(Continued)

FOREIGN PATENT DOCUMENTS

| CN | 107623803 A | 1/2018 |
| CN | 107924057 A | 4/2018 |

(Continued)

OTHER PUBLICATIONS

ISA/KR, International Search Report and Written Opinion of the International Searching Authority, International Application No. PCT/KR2019/003579, dated Jul. 12, 2019, 11 pages.

*Primary Examiner* — Sing-Wai Wu

(57) ABSTRACT

The present disclosure includes a system and method for creating a modifiable shader layer associated with a lens of a head-mountable device (HMD). The method includes providing a modifiable shader layer associated with a lens of a head-mountable display (HMD), where the modifiable shader layer is provided in a first state, and includes at least one of Liquid Crystal Smectic-A (LCSMA), liquid crystal polymer composites (LCPC), electro-wetting display (EWD), electro-dispersive display (ELDD), or electrochromic display (ECD). The method further includes causing the modifiable shader layer to transition from the first state to a second state that is different from the first state, and determining, based on whether the modifiable shader layer is in the first state or the second state, content to present via the lens of the HMD. The first state and the second state are one of a transparent state, an opaque state, or a partially opaque state.

20 Claims, 12 Drawing Sheets

(52) U.S. Cl.
CPC .............................. *G02B 2027/014* (2013.01); *G02B 2027/0118* (2013.01); *G02B 2027/0196* (2013.01)

(56) References Cited

U.S. PATENT DOCUMENTS

| | | |
|---|---|---|
| 9,626,936 B2 | 4/2017 | Bell |
| 9,766,462 B1 | 9/2017 | Worley et al. |
| 9,898,995 B2 | 2/2018 | Kim et al. |
| 2012/0068913 A1 | 3/2012 | Bar-Zeev et al. |
| 2015/0049267 A1* | 2/2015 | Crossland .............. C09K 19/02 349/24 |
| 2016/0025978 A1 | 1/2016 | Mallinson |
| 2016/0131908 A1* | 5/2016 | Fateh ................... G02B 27/646 345/633 |
| 2016/0170206 A1 | 6/2016 | Osborne et al. |
| 2016/0170211 A1 | 6/2016 | Kim et al. |
| 2017/0192265 A1 | 7/2017 | Ha et al. |
| 2017/0192499 A1* | 7/2017 | Trail ....................... G06F 3/011 |
| 2018/0004013 A1 | 1/2018 | Vasiliev et al. |
| 2018/0088323 A1* | 3/2018 | Bao ................... G02B 27/0093 |

FOREIGN PATENT DOCUMENTS

| | | |
|---|---|---|
| EP | 3317712 A1 | 5/2018 |
| KR | 1020170027135 A | 3/2017 |
| WO | 2016014234 A1 | 1/2016 |

\* cited by examiner

CONTROLLABLE MODIFIABLE SHADER LAYER FOR HEAD MOUNTABLE DISPLAY

CROSS-REFERENCE TO RELATED APPLICATION AND CLAIM OF PRIORITY

This application claims priority under 35 U.S.C. § 119(e) to U.S. Provisional Patent Application No. 62/662,139 filed on Apr. 24, 2018, titled "Controllable Shade Layer for Augmented Reality and Virtual Reality Headset." The above-identified provisional patent application is hereby incorporated by reference in its entirety.

TECHNICAL FIELD

This disclosure relates generally to head-mountable devices (HMDs) for augmented reality and virtual reality. More specifically, this disclosure relates to a method and system for creating a modifiable shader layer associated with a lens of an HMD.

BACKGROUND

Virtual reality (VR) and augmented reality (AR) equipment is becoming increasingly popular, and user expectations for the quality of VR and AR experience are increasing. VR is typically an immersive experience that transports a user to a different "reality" where the physical world has little to no relevance. However, in AR, the user is present in the real world, but has additional content or information to augment their view of the physical space around them. AR head-mountable devices (HMDs) use a see-through display (for example, a transparent lens or an opaque lens displaying an exterior-facing camera feed), while VR HMDs block the outside environment from view. Typically, VR and AR HMDs are separate devices for this reason. Additionally, transparent lenses for AR HMDs are typically limited in brightness of display due to the display components used, making them difficult to use in natural light outdoors.

SUMMARY

This disclosure provides a system and method for creating a modifiable shader layer associated with a lens of an HMD.

In a first embodiment, a method includes providing a modifiable shader layer in a first state, the modifiable shader layer associated with a lens of a head-mountable display (HMD), the modifiable shader layer including at least one of Liquid Crystal Smectic-A (LCSMA), liquid crystal polymer composites (LCPC), electro-wetting display (EWD), electro-dispersive display (ELDD), or electrochromic display (ECD), causing the modifiable shader layer to transition from the first state to a second state that is different from the first state, and determining, based on whether the modifiable shader layer is in the first state or the second state, content to present via the lens of the HMD. The first state and the second state are one of a transparent state, an opaque state, or a partially opaque state.

In a second embodiment, a head-mountable display (HMD) includes a lens, a modifiable shader layer associated with the lens, and a processor. The modifiable shader layer is provided in a first state, and includes at least one of Liquid Crystal Smectic-A (LCSMA), liquid crystal polymer composites (LCPC), electro-wetting display (EWD), electro-dispersive display (ELDD), or electrochromic display (ECD). The processor is configured to cause the modifiable shader layer to transition from the first state to a second state that is different from the first state, and to determine, based on whether the modifiable shader layer is in the first state or the second state, content to present via the lens of the HMD. The first state and the second state are one of a transparent state, an opaque state, or a partially opaque state.

In a third embodiment, a non-transitory computer readable medium embodies a computer program, the computer program comprising computer readable program code that when executed causes at least one processor to cause a modifiable shader layer provided in a first state and associated with a lens of a head-mountable display (HMD) to transition from the first state to a second state that is different from the first state, the modifiable shader layer including at least one of Liquid Crystal Smectic-A (LCSMA), liquid crystal polymer composites (LCPC), electro-wetting display (EWD), electro-dispersive display (ELDD), or electrochromic display (ECD). The computer readable program code further causes the processor to determine, based on whether the modifiable shader layer is in the first state or the second state, content to present via the lens of the HMD. The first state and the second state are one of a transparent state, an opaque state, or a partially opaque state.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
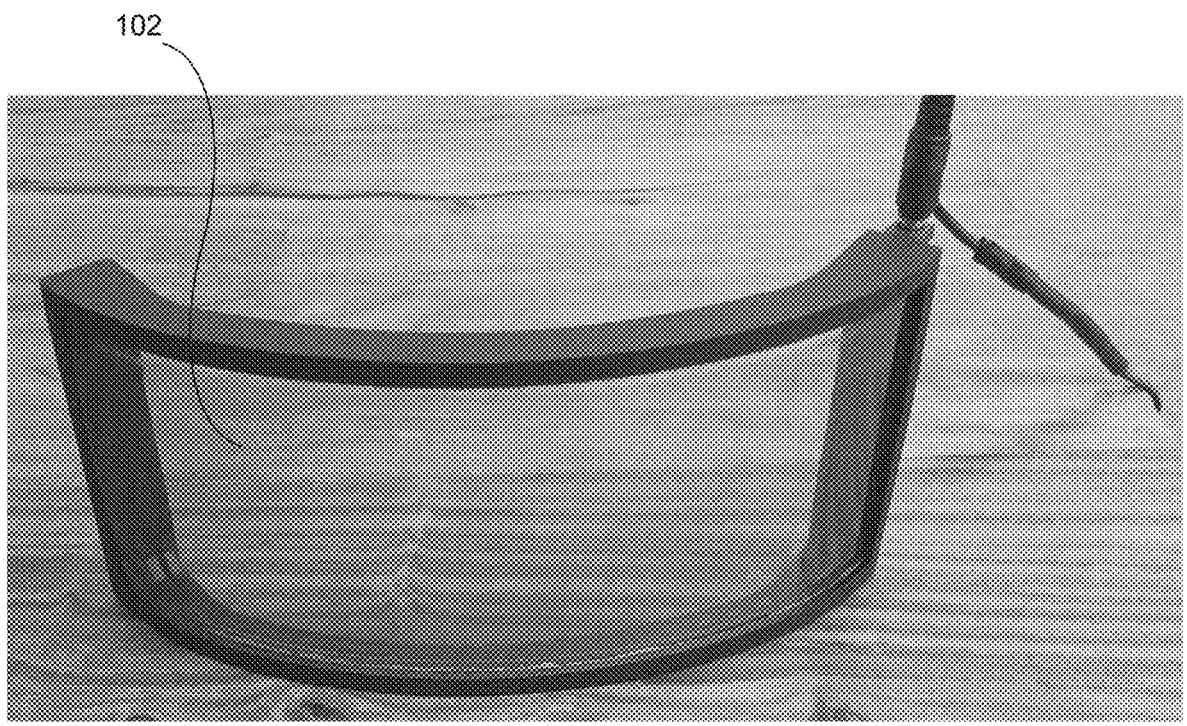
FIGS. 1A and 1B illustrate an example head-mountable device or head-mounted display (HMD) according to this disclosure.

FIGS. 1A through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

As virtual reality (VR) and augmented reality (AR) experiences become more popular and mainstream, demand for higher quality VR and AR equipment is increasing. VR experiences provide a user with a feeling of existing in an alternate reality where the physical surroundings of the user have little to no relevance. AR experiences, by contrast, are an addition of content or information to the physical world around the user.

Head-mountable devices or head-mounted displays (HMDs) are used for both VR and AR experiences. VR HMDs typically block out the surrounding physical environment of the user as much as possible in order to achieve the desired feeling of being in an alternate reality. By contrast, AR HMDs typically allow visibility through the display, either through a transparent lens or by use of a display that is connected to a camera that is external to the HMD and which feeds (e.g., real-time video stream) the surroundings to the display. Because the goals of AR and VR are different, VR and AR HMDs are usually separate devices. Furthermore, AR HMDs of the transparent lens type often are difficult to use outdoors, because ambient light overpowers the information displayed on the lens of the AR HMDs, which typically use a micro-projector to project images onto the transparent lens. In some cases, AR HMDs use a tinted lens to increase the contrast of the content displayed on the lens, however this can reduce visibility of the physical environment, which can be an annoyance to a user.

The present disclosure contemplates a modifiable shader layer that can be used in conjunction with a transparent lens of an HMD to provide a backdrop of modifiable opacity behind the lens (or a foreground of modifiable opacity in front of the lens). The modifiable shader layer can switch from transparent to opaque, and in some embodiments can be set to varying levels of opacity to allow for partial visibility through the shader layer, while improving the visual contrast of information displayed on the transparent lens. In some embodiments, an HMD using the modifiable shader layer can allow one HMD to provide both AR and VR experiences by modifying the level of opacity between partially opaque (or semi-opaque) and entirely opaque. Additionally, the modifiable shader layer can allow the HMD to function as a fully transparent lens when VR or AR functions are not in use.

In some embodiments, the modifiable shader layer has multiple addressable portions (e.g., pixels), allowing some portions of the modifiable shader layer to be made opaque while other portions of the modifiable shader layer are made transparent. This could allow, for example, a portion of a transparent lens to be made opaque or semi-opaque to facilitate display of information for an AR experience, while providing a user with clear visibility through the remainder of the transparent lens that is left transparent.

The modifiable shader layer of the present disclosure can be created using a number of materials including (but not limited to) liquid crystal smectic-A (LCSMA), liquid crystal polymer composites (LCPC), polymer dispersed liquid crystal (PDLC), polymer stabilized liquid crystal (PSLC), chiral nematic liquid crystal (CHLC), electrochromic (EC) materials, transparent electro-wetting (TEW) materials, transparent electro-dispersive (TELD) materials, and/or photochromatic materials. In some embodiments, a dark dye (e.g., a black dye) can be added to the material to absorb incident light on the modifiable shader layer in its opaque state.

A processor or controller of the HMD can cause an electric field to be applied to the material of the modifiable shader layer to induce a change in state between opaque, semi-opaque (i.e., partially opaque, partially transparent, or semi-transparent, etc.), and transparent. The modifiable shader layer can be formed by sandwiching an appropriate material between electrodes and transparent substrates (e.g., glass or plastic panes), such that power applied to the electrodes generates the desired electric field. In an embodiment using LCSMA as the material of the modifiable shader layer, the electric field could be an alternating current (AC) electric field that has a potential between 70 and 100 Volts. In this embodiment, the opaque state can be induced by an AC electric field within a frequency range of 10 Hz to 50 Hz, and the transparent state can be induced by an AC electric field within a frequency range of 1 kHz to 4 kHz. A signal used to induce the transition can include a waveform that can be modified to change a speed of transition between opacity states.

In some embodiments, a modifiable shader layer system can be comprised of more than one material layer, or more than one modifiable shader layer. For example, a first material layer could be capable of full transparency or full opacity, and a second material layer could be capable of full transparency or semi-opacity. An example of such an embodiment includes an LCSMA material layer and an electrochromic material layer. In this way, multiple materials can be used to achieve a range of opacity from full opacity to full transparency. It is understood that "full transparency" and "full opacity," and similar terms in this disclosure, do not necessarily mean 100% transparency or opacity, but can also include near-100% transparency or opacity.

A processor or controller of the HMD can also use information about the state of the modifiable shader layer to determine what content to display and how to display it. For example, if the modifiable shader layer is in the transparent or partially opaque state, the processor could determine to display an AR application via the lens of the HMD. This determination could be made because VR applications may be inappropriate to display when the surrounding physical environment is still visible. Accordingly, if the modifiable shader layer is in the opaque state, the processor could determine to display VR application content via the lens of the HMD. In another example, when the modifiable shader layer is comprised of multiple portions that can change state independently, the processor could determine to display content on only a portion of the lens that is in an opaque or semi-opaque state, while leaving a transparent portion of the lens free of content.

In some embodiments, the modifiable shader layer could transition states based on user input. For example, voice commands, inputs via hardware buttons on the HMD or remote controls for the HMD, or software triggers could be user-initiated commands to change the modifiable shader layer state. In other embodiments, the HMD could determine to transition the state of the modifiable shader layer based on sensor input (e.g., from an ambient light sensor or a motion sensor) or software triggers (e.g., when a VR application is launched by the user, the HMD could determine to transition the modifiable shader layer to the opaque state).

Figure 1B:
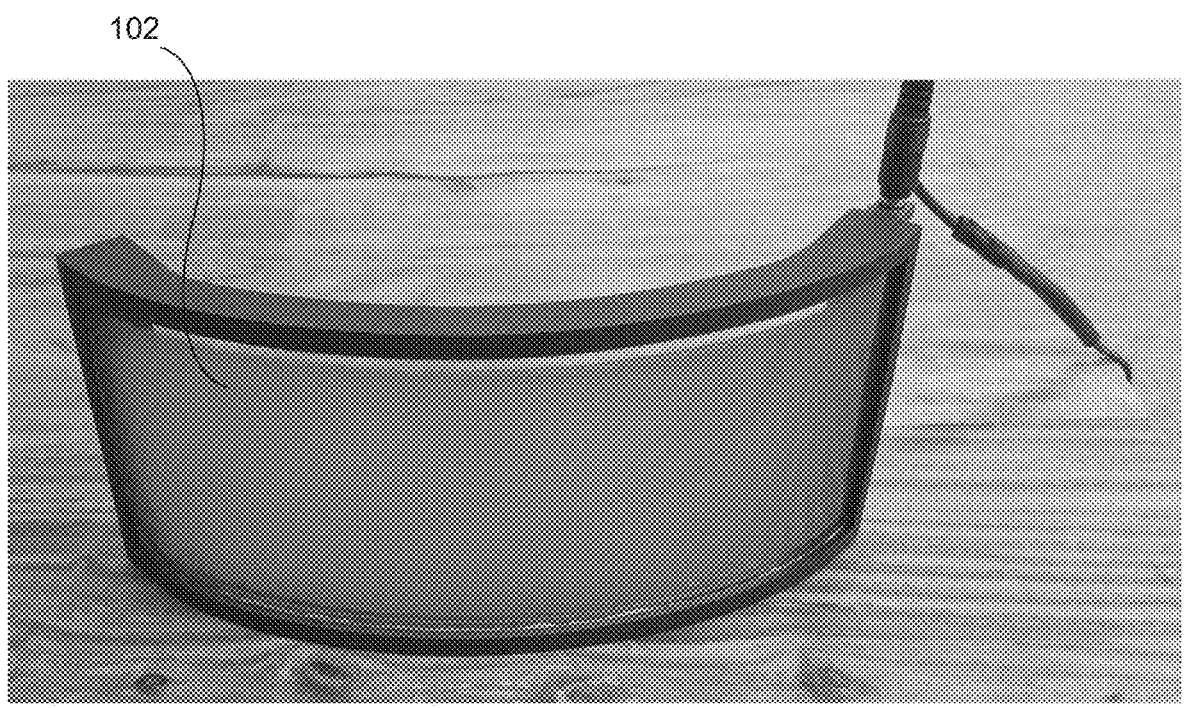

FIGS. 1A and 1B illustrate an example modifiable shader layer 102 associated with a lens of a head-mountable device or head-mounted display (HMD) according to this disclosure. In this embodiment, the lens is a transparent lens, and the modifiable shader layer 102 is located exterior to the lens so as to function as a backdrop (or located interior to the lens so as to function as a foreground) to the lens while a user is wearing the HMD. The HMD of FIGS. 1A and 1B can be a projection-type HMD that projects an image onto the interior surface of the lens. The partial reflection of this projection is viewable by a user of the HMD to provide information for an AR or VR experience.

In the embodiment of FIG. 1A, the modifiable shader layer 102 is in a transparent or semi-transparent state. In the transparent state, the HMD could be appropriate to use for AR applications, or simply as a transparent lens that does not hinder the ability of a user to navigate the physical environment. In the embodiment of FIG. 1B, the modifiable shader layer 102 is in an opaque state. In the opaque state, the HMD could be appropriate to use for VR applications. In some embodiments, the color of the modifiable shader layer 102 in the opaque state is determined by a dye applied to the modifiable shader layer 102, as will be further described below. In the embodiment of FIG. 1B, a black dye is applied to the modifiable shader layer 102.

Although FIGS. 1A and 1B illustrate one example of an HMD, various changes may be made to FIGS. 1A and 1B. For example, instead of a projection system, the HMD could use a lens that is a transparent display, such as a liquid crystal display (LCD), or the HMD could include a separate transparent display layer in addition to the lens and the modifiable shader layer 102 (for example, between the lens and the modifiable shader layer 102.

Figure 2:
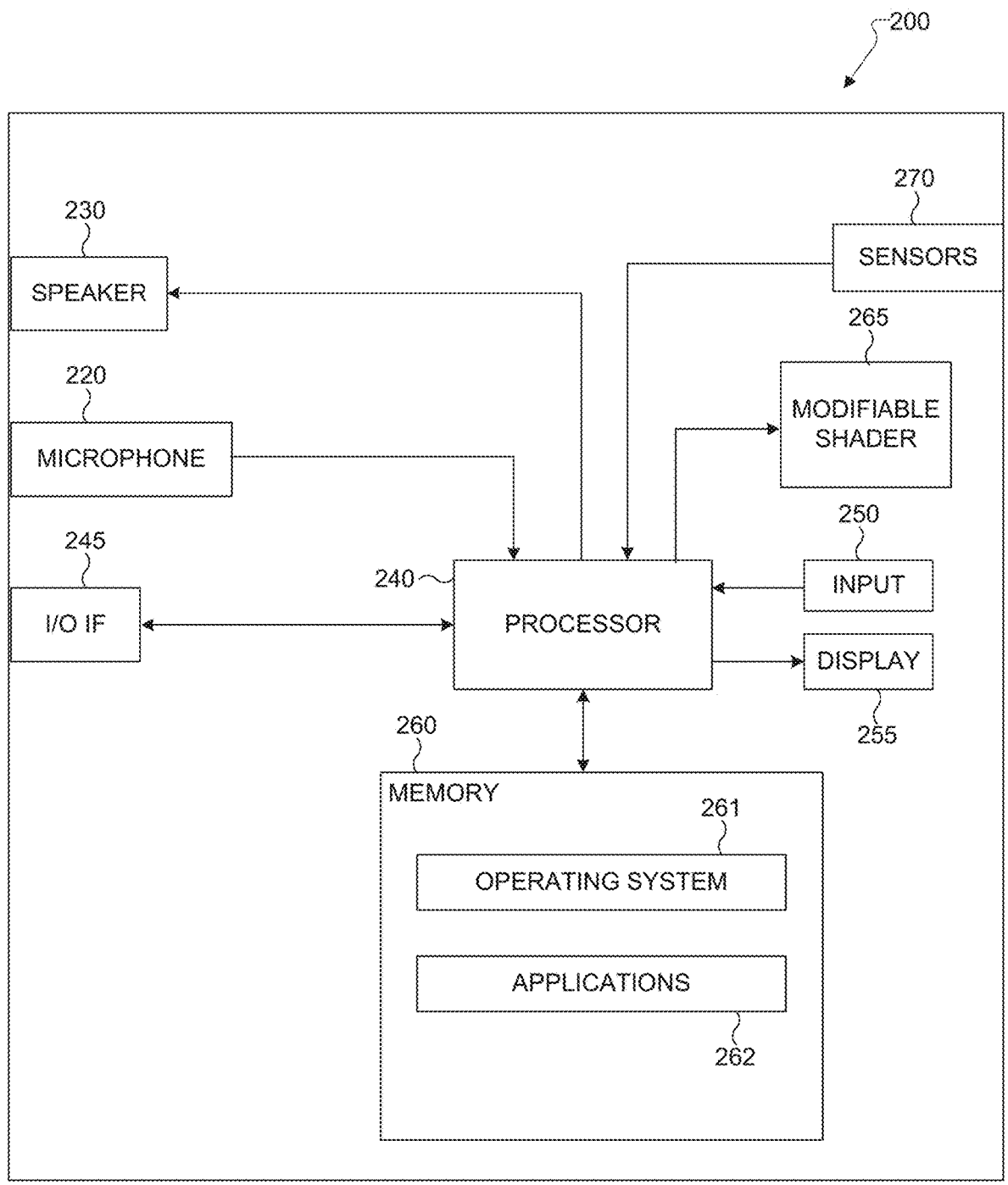
FIG. 2 illustrates an example electronic device according this disclosure.

FIG. 2 illustrates an example electronic device 200 according to this disclosure. For example, the electronic device 200 could be an HMD used for AR or VR experiences. In some embodiments, the electronic device 200 includes a speaker 230, a processor 240, an input/output (I/O) interface (IF) 245, an input interface 250, a display 255, a modifiable shader layer 265, a memory 260, and sensors 270. The memory 260 includes an operating system (OS) program 261 and one or more applications 262, which could include AR and VR applications.

The processor 240 can include one or more processors or other processing devices that execute the OS 261 stored in the memory 260 in order to control the overall operation of the electronic device 200. In some embodiments, the processor 240 includes at least one microprocessor or microcontroller. The processor 240 is also capable of executing other processes and programs resident in the memory 260. The processor 240 can move data into or out of the memory 260 as required by an executing process. In some embodiments, the processor 240 is configured to execute the applications 262 based on the OS 261 or in response to signals received from external devices or an operator. The processor 240 is also coupled to the I/O interface 245, which provides the electronic device 200 with the ability to connect to other devices such as laptop computers and handheld computers. The I/O interface 245 is the communication path between these accessories and the processor 240.

The processor 240 is also coupled to the input interface 250 and the display 255. The operator of the electronic device 200 can use the input interface 250 to enter data into the electronic device 200. The display 255 can be a micro projector, liquid crystal display, or other display capable of rendering graphics on a lens. These graphics could include a virtual reality environment or augmented reality environment, including rendering text and/or graphics, such as instructions, messages, or other objects in the virtual reality environment or augmented reality environment.

The processor 240 is additionally coupled to the modifiable shader layer 265. The modifiable shader layer 265 can change opacity based on instructions received from the processor 240. In some embodiments, as described below, the processor 240 can send a signal to the modifiable shader layer 265 that causes an electric field to be applied to the modifiable shader layer 265 in order to change the opacity of the modifiable shader layer 265. The processor 240 could, in some embodiments, receive instructions via the input interface 250 (e.g., from a user of the electronic device 200) or the input/output interface 245 (e.g., from a third-party application running on another electronic device) to modify the opacity of the modifiable shader layer 265.

The sensors 270 detect information related to the electronic device 200 and relay it to the processor 240 for further processing. For example, the sensors 270 can include an ambient light sensor or a motion sensor. Inputs received from an ambient light sensor could be used by the processor 240 to, for example, automatically determine whether to adjust opacity of the modifiable shader layer 265 to account for ambient light levels in the physical environment around the electronic device 200. As opacity of the modifiable shader layer 265 affects the contrast of the display 255, this could allow the processor 240 to maintain a consistent level of contrast as ambient light levels vary. Inputs received from a motion sensor could be used by the processor 240 to determine that the modifiable shader layer 265 should be made transparent for the safety of the user, if the motion sensor input indicates that the user is moving.

The memory 260 is coupled to the processor 240. Part of the memory 260 could include a random access memory (RAM), and another part of the memory 260 could include a Flash memory or other read-only memory (ROM).

Although FIG. 2 illustrates an example electronic device 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In addition, electronic devices can come in a wide variety of configurations, and FIG. 2 does not limit this disclosure to any particular system or device.

Figure 3A:
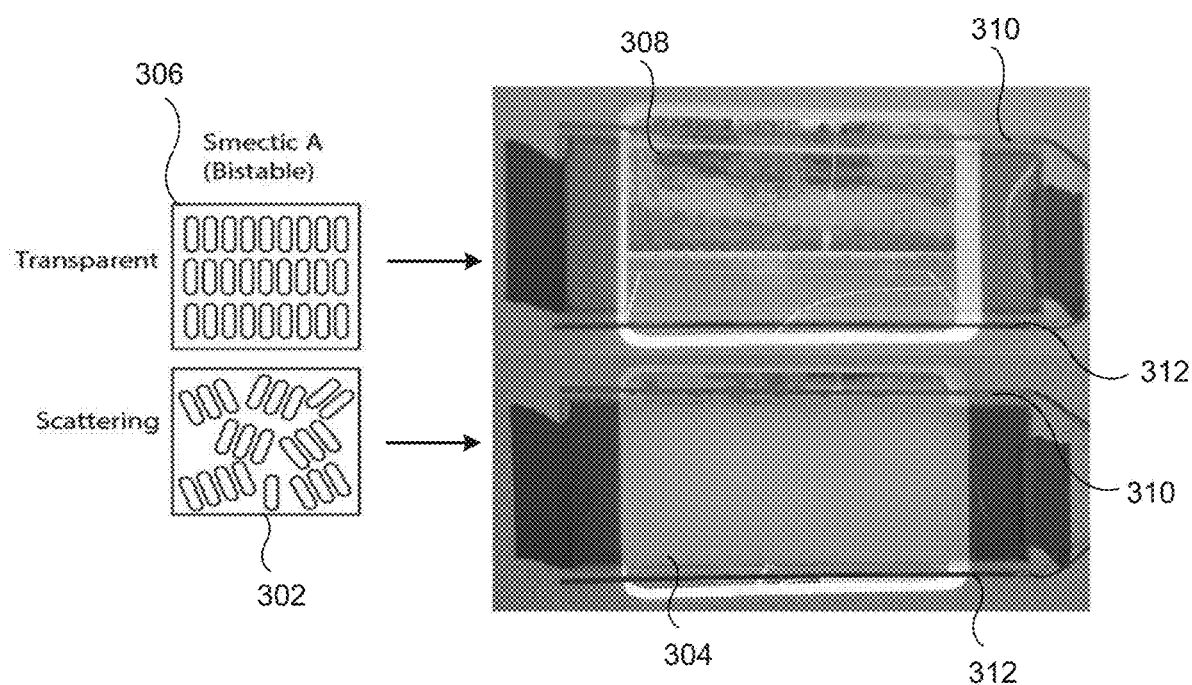
FIG. 3A illustrates an example modifiable shader layer comprising liquid crystal smectic A according this disclosure.

FIG. 3A illustrates an example modifiable shader layer comprising liquid crystal smectic A according this disclosure. In some embodiments, the modifiable shader layer of FIG. 3A is the modifiable shader layer 102 of FIG. 1 or the modifiable shader layer 265 of FIG. 2.

In the embodiment of FIG. 3A, liquid crystal smectic A (LCSMA) phase is used as the material that changes opacity in the modifiable shader layer. The smectic A phase of liquid crystal molecules self-assembles into a bi-layered arrangement. A useful feature of this bi-layered arrangement is that it possesses larger ionic conductivity along the layers than across them. As a result, ionic electrohydrodynamic effects occur when a low-frequency electric field (e.g., a low-frequency alternating current (AC) electric field) is applied across the LCSMA material, between electrodes 310 and 312. This induces a chaotic orientation 302 of the LCSMA material that scatters incident light. This causes the LCSMA material to appear opaque, as illustrated by the opaque material 304. As noted above, a colored dye, such as a black dye, can be applied to the liquid crystal molecules to cause them to absorb incident light in the opaque state.

Conversely, when a high-frequency electric field (e.g., a high-frequency AC electric field) is applied to the LCSMA material, between electrodes 310 and 312, the liquid crystal molecules are induced to align with the applied electric field through dieletric reorientation, causing the LCSMA material to appear transparent. The aligned orientation 306 that corresponds to the transparent state is illustrated by the transparent material 308. Another advantage of LCSMA is that its high viscosity makes it bi-stable—i.e., power is only required to transition the material to either the chaotic orientation 302 or the aligned orientation 306, after which the material will passively remain in that orientation without any further power.

Figure 3B:
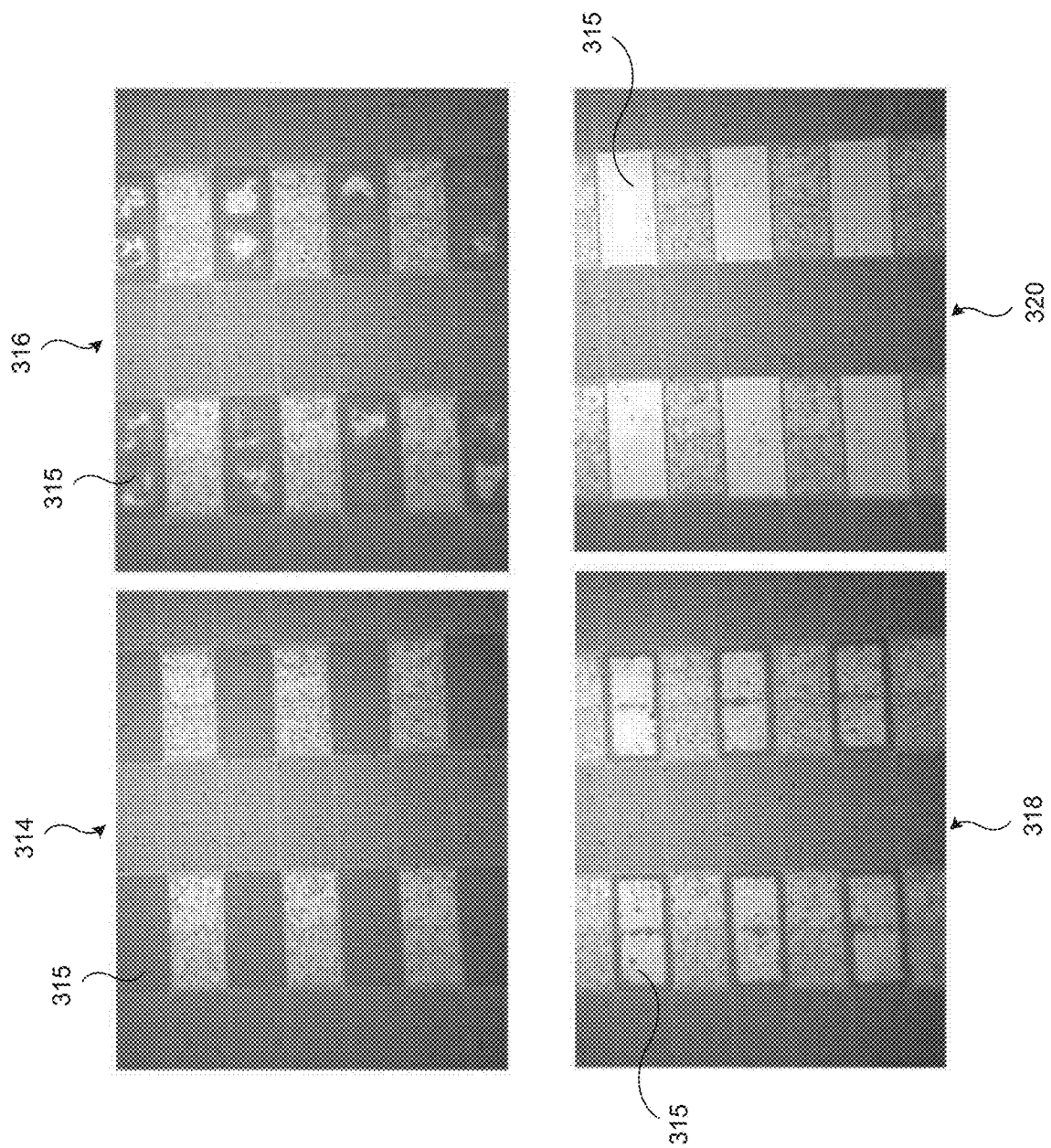
FIG. 3B illustrates an example of state transitions of an LCSMA material, such as the LCSMA material of FIG. 3A, according to this disclosure.

FIG. 3B illustrates an example of state transitions of an LCSMA material, such as the LCSMA material of FIG. 3A, according to this disclosure. For example, slide 314 illustrates a group of LCSMA cells 315 in the opaque state. Slides 316 and 318 illustrate the group of LCSMA cells 315 in semi-opaque (or semi-transparent) states as they transition towards the transparent state. Slide 320 illustrates the group of LCSMA cells 315 in the transparent state.

Figure 4:
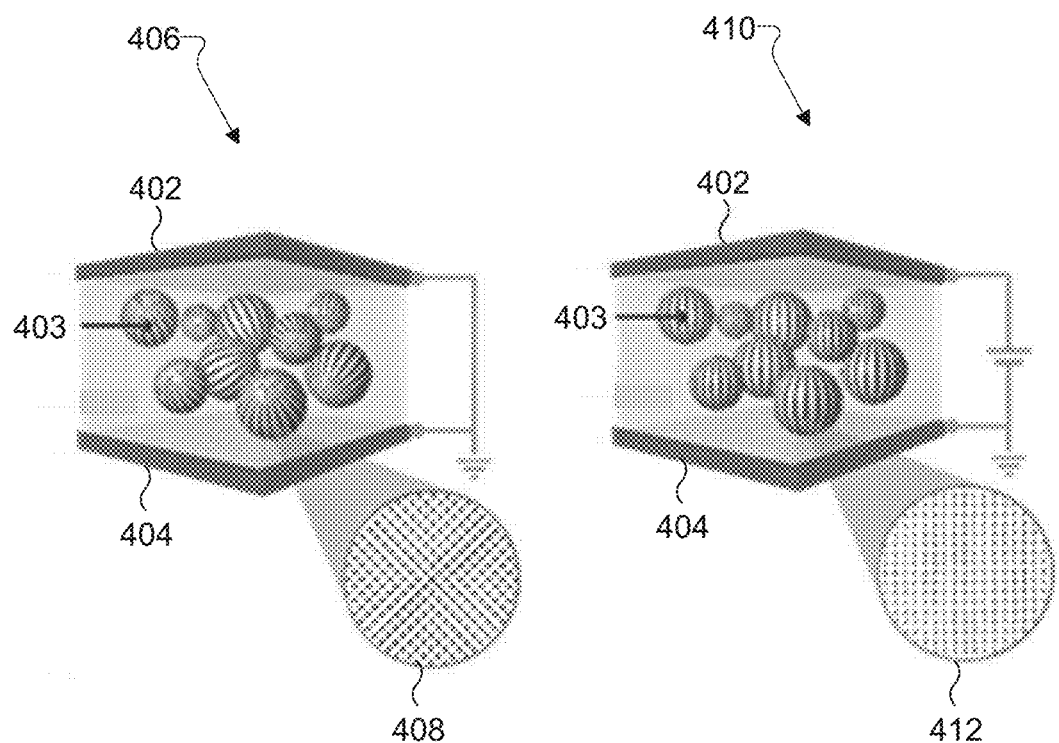
FIG. 4 illustrates an example modifiable shader layer comprising liquid crystal polymer composites (LCPC) according this disclosure.

FIG. 4 illustrates an example modifiable shader layer comprising liquid crystal polymer composites (LCPC) according this disclosure. In some embodiments, the modifiable shader layer of FIG. 4 is the modifiable shader layer 102 of FIG. 1 or the modifiable shader layer 265 of FIG. 2.

Adding high molecular weight polymers to low molecular weight liquid crystals can create a mixture that promotes light scattering by the polymers, and can produce multi-domain random orientation liquid crystal structures that scatter light. Liquid crystals can be dissolved or dispersed in a liquid polymer, which is then solidified, polymerized, or solvent evaporated to phase-separate the liquid crystals and the polymers in the mixture, forming a heterogeneous mixture.

During the change of the polymer from a liquid to a solid, the liquid crystals in the mixture become incompatible with the solid polymer and form droplets throughout the solid polymer. The rate of cooling, polymerization, or evaporation of the mixture can affect the size of the droplets, which in turn can affect the final operating properties of the LCPC. In some embodiments, the liquid mixture of polymer and liquid crystals, before curing, is placed between two layers of glass or plastic that are coated with a thin layer of a transparent, conductive material that contacts the mixture. These conductive layers can be indium tin oxide (ITO) layers. These layers form electrodes 402 and 404. The polymer is then cured, forming a basic sandwich structure of the LCPC layer as illustrated in FIG. 4. This structure is in effect a matrix of capacitors.

In some embodiments, an LCPC layer may take the form of a polymer dispersed liquid crystal (PDLC). In a PDLC, the concentration of liquid crystals is approximately equal to the concentration of polymers in the mixture. The PDLC mixture has two states. It is opaque in its natural state, and transparent when an electric field is applied across electrodes 402 and 404. These states are further described below.

The phase-separated PDLC mixture, when the liquid crystals are randomly oriented, scatters light due to random spatial distribution of different indices of refraction of the polymer and the liquid crystal droplets. View 406 illustrates this state. The black lines on the liquid crystal droplets 403, which are oriented randomly, indicate an axis (called the "director") relative to which a long axis of liquid crystals of the droplet 403 are generally parallel. Within each liquid crystal droplet 403, the liquid crystals are in a radial configuration with a point defect at the center of the droplet, as illustrated in expanded view 408. The liquid crystal droplets are randomly oriented when no electric field is applied to the electrodes 402 and 404. The large size of the polymer molecules and of the liquid crystal droplets 403 increases the intensity of the scattering caused by the random orientation.

If an electric field is applied between electrodes 402 and 404, the liquid crystals align parallel to the electric field, as shown in view 410, allowing light to pass between the liquid crystals in the PDLC mixture. Within each liquid crystal droplet, the liquid crystal molecules are in an axial configuration, with their long axes aligned parallel to the electric field, as illustrated in expanded view 412. If the electric field is removed, the liquid crystals will return to the random orientation (i.e., radial configuration) of view 406. PDLC materials have a lag in returning from the axial configuration to the random configuration (i.e., from transparent to opaque) when the electric field is removed, which can in some embodiments be used to maintain the opaque state by pulsing the electric field to save power.

In some embodiments, an LCPC layer may take the form of a polymer stabilized liquid crystal (PSLC). In a PSLC mixture, the concentration of polymer is less than 10% of the concentration of the liquid crystals in the mixture. As a result, the liquid crystals are continuously distributed throughout the mixture rather than dispersed as droplets. The phase-separated PSLC mixture creates differently oriented domains of liquid crystals. These domains scatter light, and the size of the domains determines the intensity of the scattering.

When no electric field is applied to the PSLC mixture, the liquid crystals near the polymers tend to align with the polymer network in a stabilized configuration. A polymer-stabilized homogeneously aligned nematic liquid crystal arrangement allows light to pass through unscattered because of the homogeneous orientation of both the polymer and the liquid crystals. When an electric field is applied to the PSLC mixture, the liquid crystals align with the vertical field, but the polymer network tries to hold the liquid crystals in the horizontal homogenous orientation. As a result, a multi-domain structure forms wherein liquid crystals within a given domain are oriented uniformly, but the domains are oriented randomly relative to each other. Incident light encounters the different indices of refraction of the randomly oriented domains and it is scattered. In some embodiments, to avoid the scattering being dependent on the direction of linear polarization, which makes intensity control difficult, a homeotropic negative anisotropy liquid crystal can be used to create multi-domains that tilt in different directions about the field in the field-on state.

Figure 5:
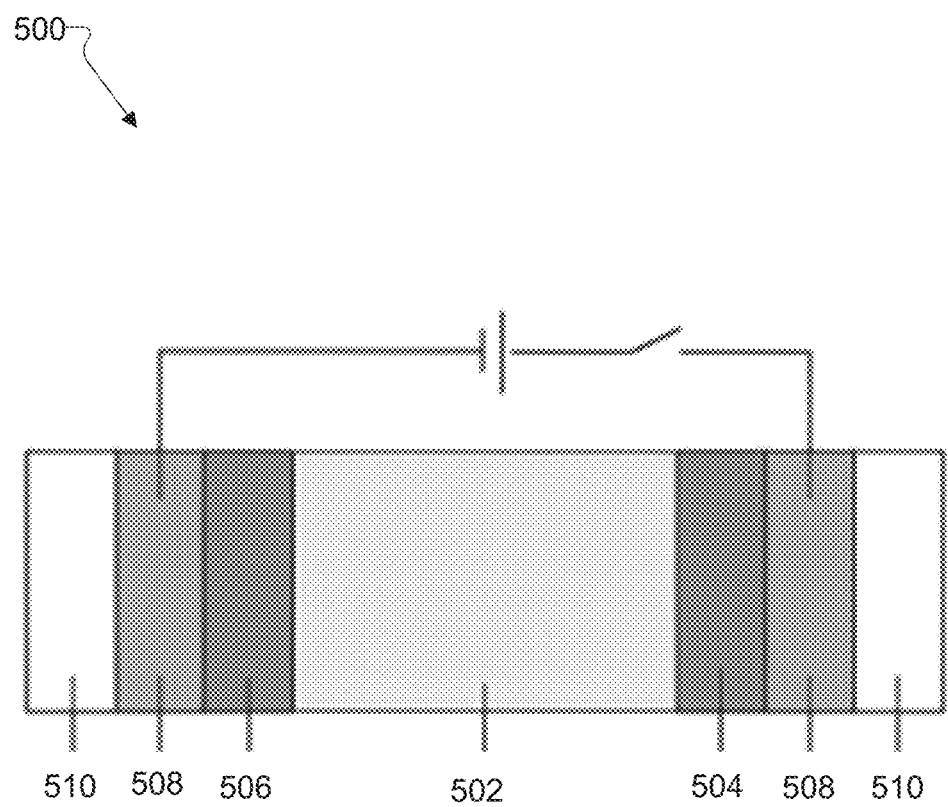
FIG. 5 illustrates an example modifiable shader layer comprising electrochromic display (ECD) material according this disclosure.

FIG. 5 illustrates an example modifiable shader layer comprising electrochromic display (ECD) material according this disclosure. In some embodiments, the modifiable shader layer of FIG. 5 is the modifiable shader layer 102 of FIG. 1 or the modifiable shader layer 265 of FIG. 2.

Electrochromism is the phenomenon of reversibly changing color when a burst of electric charge is applied to a material. Various materials and structures can be used to construct electrochromic devices. Electrochromism occurs due to electrochemical redox reactions that take place in electrochromic materials. These reactions cause the material to have changing light transmission properties based on applied voltage. This allows control over the amount of light and heat passing through the material via applied voltage. The electrochromic material can change its opacity, for example by changing between a colored (e.g., blue, silver, white, etc.), translucent or opaque state, and a transparent state. Although a burst of electricity is required to change the opacity of an electrochromic material, no electricity is needed to maintain the particular shade which has been reached once the change has occurred.

In transmissive electrochromic panels such as ECD 500, a conductive electrolyte 502 is sandwiched between an electrochromic material layer 504 and an ion storage layer 506. These layers are in turn sandwiched between two transparent conductive layers 508, which are then placed between glass or plastic substrates 510. An electric field can then be applied between the conductive layers 508. They use light passing straight through to get their effect. An ECD 500 can be made with various colors as the transition color. In these cases, the display will transition to that color (for example, black). ECD 500 has a memory effect, as no power is required to maintain the state of an ECD once a desired level of opacity and/or color has been reached.

Figure 6:
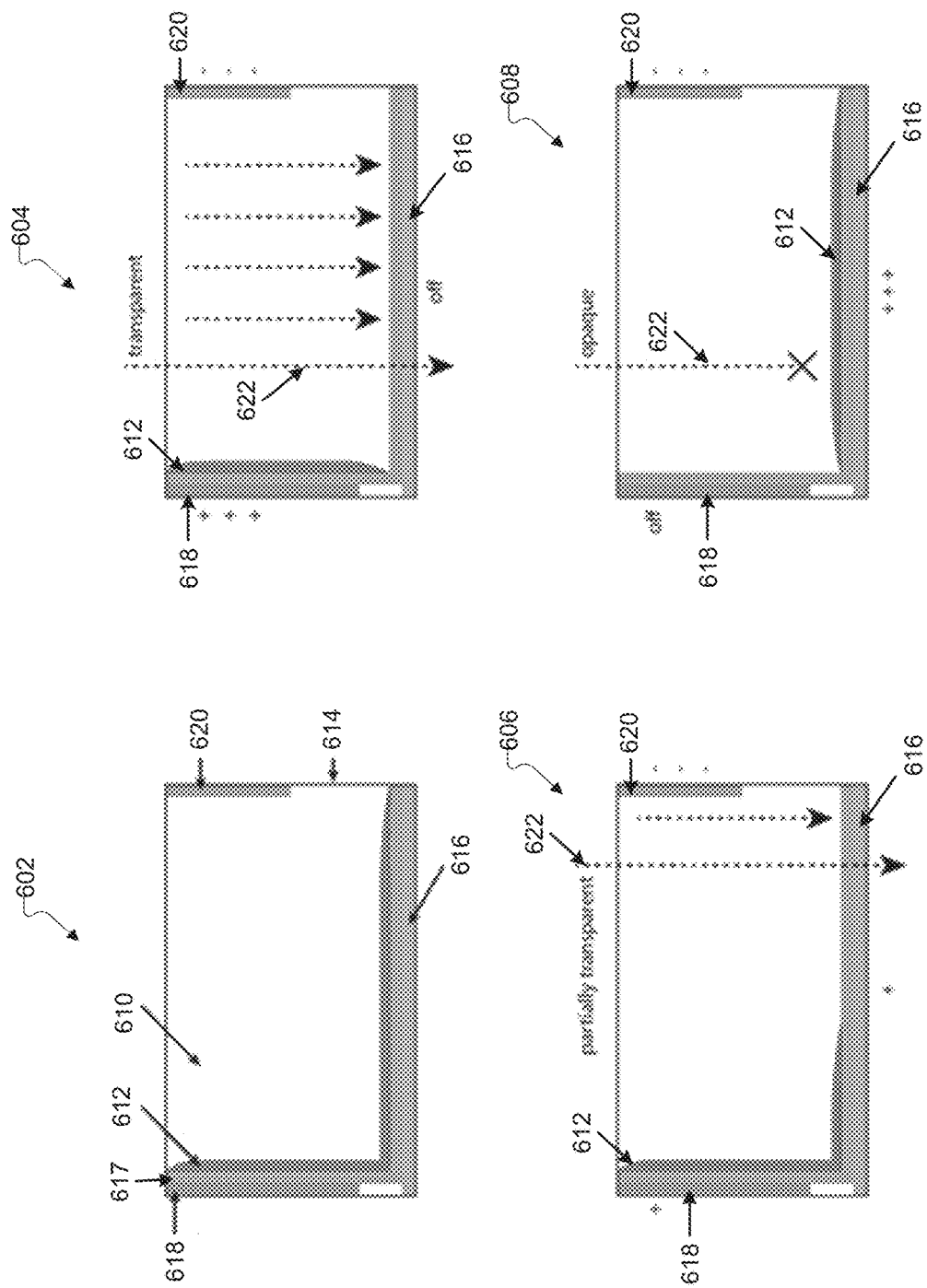
FIG. 6 illustrates an example modifiable shader layer comprising transparent electro-wetting display (tEWD) materials according this disclosure.

FIG. 6 illustrates an example modifiable shader layer comprising transparent electro-wetting display (tEWD) materials according this disclosure. In some embodiments, the modifiable shader layer of FIG. 6 is the modifiable shader layer 102 of FIG. 1 or the modifiable shader layer 265 of FIG. 2. FIG. 6 illustrates a two dimensional top-down view of a single tEWD cell, but it is understood that the elements of FIG. 6 can be extended to create a three-dimensional cell.

Electro-wetting displays (EWDs) can include small cells filled with two liquids that are immiscible. One liquid can be a transparent liquid 610 (such as water), while the other liquid can be an opaque liquid 612 (such as a colored oil). View 602 illustrates a cell containing the two liquids 610 and 612 in the volume 614 of the cell. The cell also includes a front electrode 616, a side electrode 618, and a liquid electrode 620. In a passive state (i.e., when no power is applied to any of the electrodes 616, 618, or 620), the opaque liquid 612 disperses itself along the surface of the front electrode 616 (which is a transparent electrode formed of a material such as ITO). The front electrode 616 and the side electrode 618 can be coated with a hydrophobic material 617 that the opaque liquid 612 can wet easily, encouraging the opaque liquid to form a layer rather than beads. This passive state provides some opacity.

The opaque liquid 612 can be a liquid that is attracted to an electrode when an electric field is applied. When the opaque liquid 612 is attracted to an electrode, it tends to bundle itself into a spheroid around the electrode. The unique cell structure with dual attractor electrodes (side electrode 618 and front electrode 616) allows the tEWD to pull the opaque liquid 612 to one side completely rather than leaving it as a dot on the display, thus improving transparency performance. In view 604, when transparency is desired, an electric field applied between the liquid electrode 620 and the side electrode 618 pulls the opaque liquid 612 to the side electrode 618, and leaves the remainder of the display transparent. The transparency is illustrated by light 622 passing through the front of the cell.

In view 608, when opacity is desired, an electric field can be applied between the liquid electrode 620 and the front electrode 616, which can cause the opaque liquid 612 to be attracted to the front electrode 616 along the front surface of the cell. In view 606, when partial transparency (i.e., partial opacity) is desired, an electric field can be applied between the liquid electrode 620 and both the front electrode 616 and the side electrode 618, thereby collecting the opaque liquid 620 partially at the front surface of the cell along the front electrode 616 and partially at the side surface of the cell along the side electrode 618.

In the transparent state (e.g., in view 604), the tEWD material can have the same transparency as the clear liquid 610 and the front electrode 616. In the opaque or partially opaque states (e.g., in views 606 and 608), the opacity can be controlled by the amount (or thickness) of the opaque liquid 612 layer, as well as by the amount of liquid pulled away from the front electrode 616 to the side electrode 618. Color displays can be achieved by using different colored opaque liquids 612 in adjacent cells. In some embodiments, tEWD materials need power applied to maintain the transparent state. The energy needed can be very low, since the electric fields in the cells do not need to change to maintain state.

Figure 7:
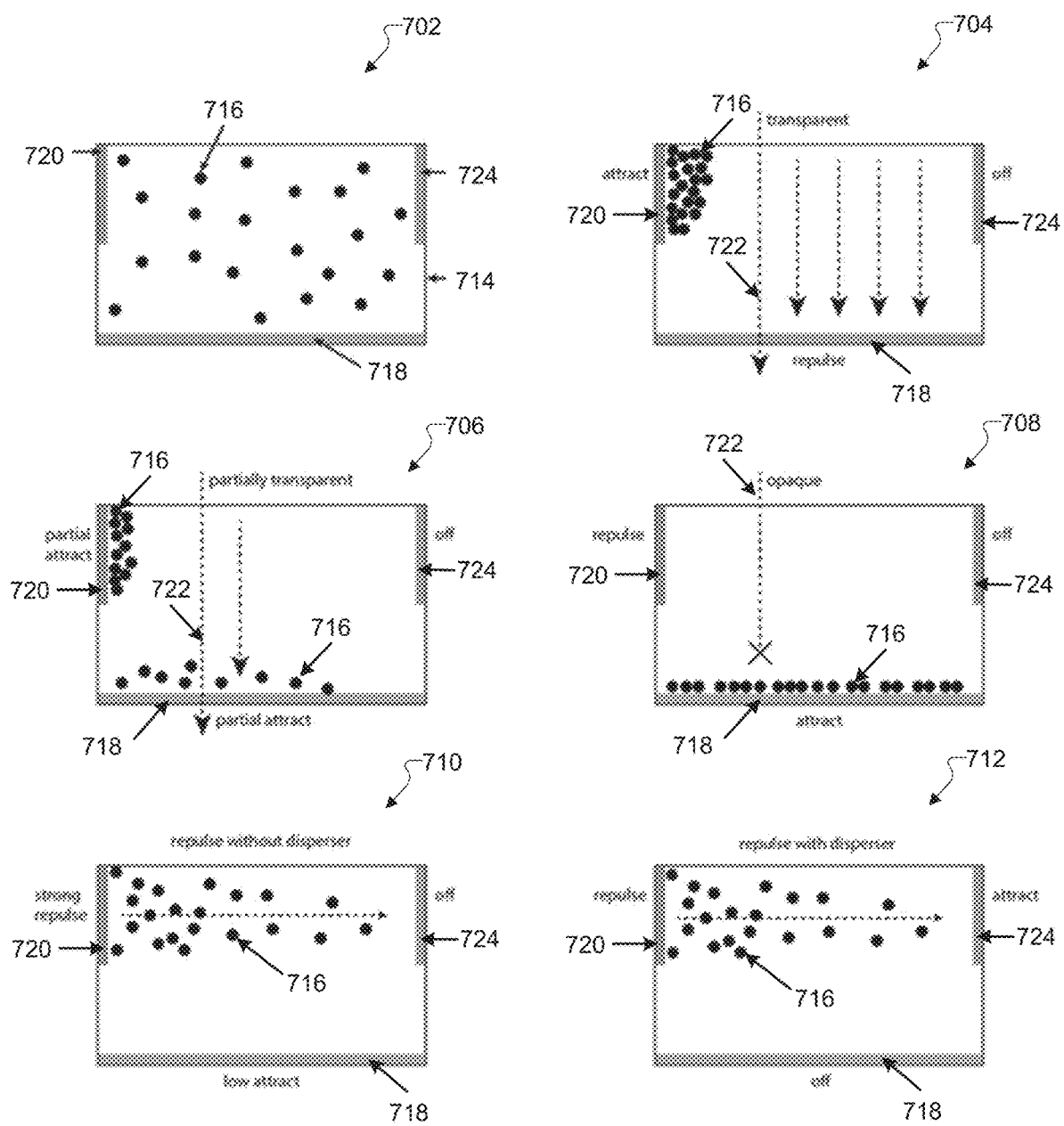
FIG. 7 illustrates an example modifiable shader layer comprising transparent electro-dispersive display (tELDD) materials according this disclosure.

FIG. 7 illustrates an example modifiable shader layer comprising transparent electro-dispersive display (tELDD) materials according this disclosure. In some embodiments, the modifiable shader layer of FIG. 7 is the modifiable shader layer 102 of FIGS. 1A and 1B or the modifiable shader layer 265 of FIG. 2.

The tELDD material operates based on electrophoresis, i.e., the separation of particles using a uniform electric field. In some embodiments, tELDDs use small cells (one of which is illustrated in views 702-712) that are filled with a liquid 714 and colored particles (or capsules) 716. The colored particles 716 respond to electric fields, and are attracted to an electrode that is used to apply an electric field. The tELDD cell uses one large transparent coating electrode 718 parallel to the front (or back) surface of the cell, and a smaller attractor electrode 720 in one side or corner, which may or may not be transparent. The transparent coating electrode 718 can be formed of a material such as ITO.

The colored particles 716 used can be attracted to either polarity of charge (negative or positive), which can be referred to as the attractive polarity. The complementary polarity can be referred to as the repulsive polarity. To transition the cell to a transparent state, as shown in view 704, the attractor electrode 720 is attractively charged while the coating electrode 718 is charged repulsively. The colored particles 716 are attracted to the attractor electrode 720, forming a clump that obscures only a small fraction of the cell, rendering the cell effectively transparent from even a close distance. Accordingly, incident light 722 can pass through the cell. When transparent, the tELDD cell can have the same transparency as the coating electrode 718, which can exceed approximately 90%.

To transition the cell to an opaque state, as shown in view 708, the reverse of the polarity used in view 704 is applied. That is, the attractor electrode 720 is repulsively charged while the coating electrode 718 is attractively charged. The colored particles 716 are attracted to the coating electrode 718, forming an opaque layer on the coating electrode 718 and blocking light 722 from passing through. The amount of opacity can be varied, as shown in view 706, by applying some attractive charge to both the attractor electrode 720 and the coating electrode 718 at the same time. This draws some of the colored particles 716 to each of the electrodes, and reduces the thickness of the layer of colored particles 716 that covers the front surface of the cell, allowing light 722 to partially pass through.

In some embodiments, to improve coating performance, a pulse of high voltage can be used to disperse the colored particles 716 away from the attractor electrode 720 before applying the attractive charge on the coating electrode 718, as shown in view 710. In other embodiments, to achieve the same effect, a small disperser electrode 724 placed diagonally opposite the attractor electrode 720 can be used to pull the colored particles 716 away from the attractor electrode 720 before charge is applied to the coating electrode 718, as shown in view 712. Color displays can be achieved by using multiple different colored particles 716. In some cases, the colored particles 716 can be transparent or reflective, but only to specific colors, such that the combination of reflected or filtered light can reproduce colors.

Figure 8:
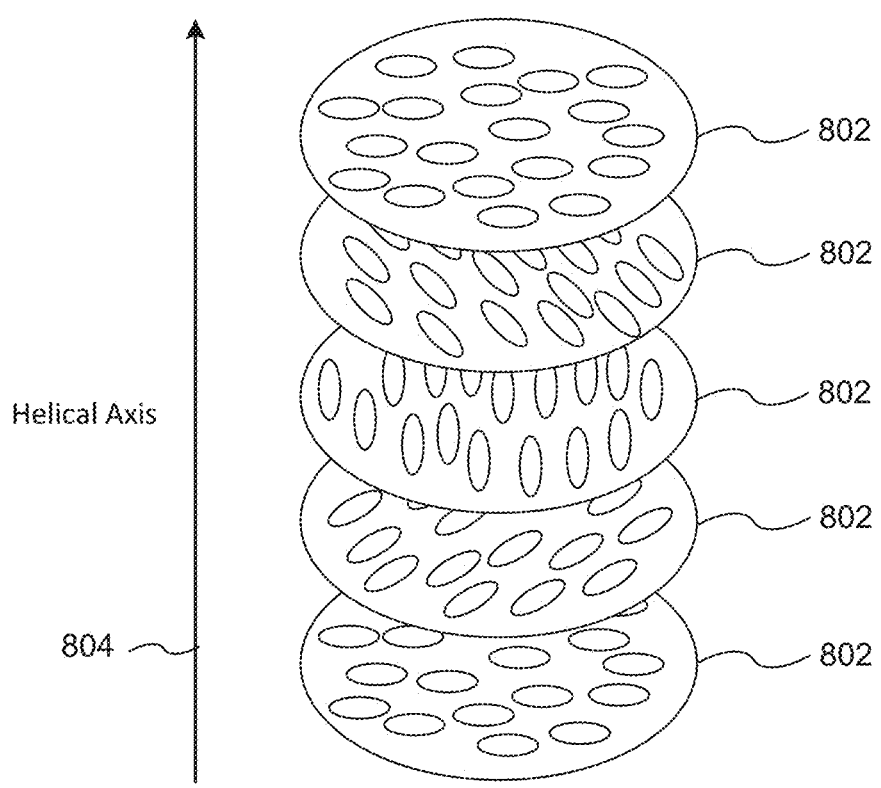
FIG. 8 illustrates an example modifiable shader layer comprising chiral nematic liquid crystal (ChLC) according this disclosure.

FIG. 8 illustrates an example modifiable shader layer comprising chiral nematic liquid crystal (ChLC) according this disclosure. In some embodiments, the modifiable shader layer of FIG. 8 is the modifiable shader layer 102 of FIGS. 1A and 1B or the modifiable shader layer 265 of FIG. 2. Similar to the LCPCs described above, ChLC molecules can be sandwiched between two glass or plastic substrates coated with a transparent conductive electrode (for example, made of ITO). When ChLC molecules align in layers 802, the orientation of the director of each layer rotates slightly in each layer, creating a helical structure.

In some embodiments, ChLC molecules can form a naturally stable spiral about a helical axis 804. If no electric field is applied to the ChLC molecules, and if the helical axis 804 is perpendicular to the substrate, the molecules can reflect light. This is called a planar state. Because of the photonic crystalline nature of the helical structure, a specific wavelength of incident light is reflected by the periodically varying refractive index on the ChLC plane. In this state, Bragg reflection occurs, reflecting circular polarized light (right or left handed polarized depending on the spiral structure). The planar state is stable in the absence of an electric field. The planar state has zero free elastic energy because it is in the lowest energy natural state, and it has zero free electric energy because the liquid crystals are perpendicular to the field everywhere.

If no electric field is applied to the ChLC molecules, and if the helical axis 804 is not necessarily perpendicular to the substrate, but is instead almost randomly oriented, the molecules are in a multi-domain focal conical state that scatters incident light. In this state there is no reflection of incident light, so only an absorption layer (if one exists) can reflect light. If the absorption layer is black, the ChLC material will reflect the color depending on the Bragg reflection of the planar area, and otherwise will be black. The focal conical state is also stable in the absence of an electric field. The focal conical state has positive free elastic energy because of molecular bending in the random orientation, and negative free electric energy because the liquid crystals can be parallel to the electric field. This means that the elastic forces are against the planar-to-focal conic transition, while the electric field promotes this transition.

If an intermediate strength electric field is applied to the ChLC molecules, the helical axis 804 turns to be parallel with the substrates, and the ChLC is in a state known as a fingerprint state. If a sufficiently high electric field (based on the material composition) is applied to the ChLC molecules, the molecules are driven into a vertical orientation, and the ChLC is in a hemeotropic state, which is transparent.

To switch from the planar stable state to the focal conic stable state, a sufficiently high voltage is applied to push the molecules to the focal conic state, where they remain due to surface anchoring or polymer stabilization, even when the voltage is turned off. To switch back from the focal conic stable state to the planar stable state, a higher voltage is applied to push the molecules to the hemeotropic state. In the hemeotropic state, when the field is turned off, the liquid crystal molecules relax back to the planar state. Varying the electric field voltages can produce different reflectances, thereby producing grayscale. To add color, a color filter can be added, or ChLC layers of different pitch that will Bragg reflect different wavelengths of incident light can be used. Switching between the planar and focal conical states can create a black and white bi-stable display. However, it is also possible to achieve transparency bi-stability for all the visible wavelengths in the planar state with a long pitch (Bragg reflection will happen at the infrared wavelengths). This approach can reduce the need to apply an electric field to achieve the transparent state.

Figure 9:
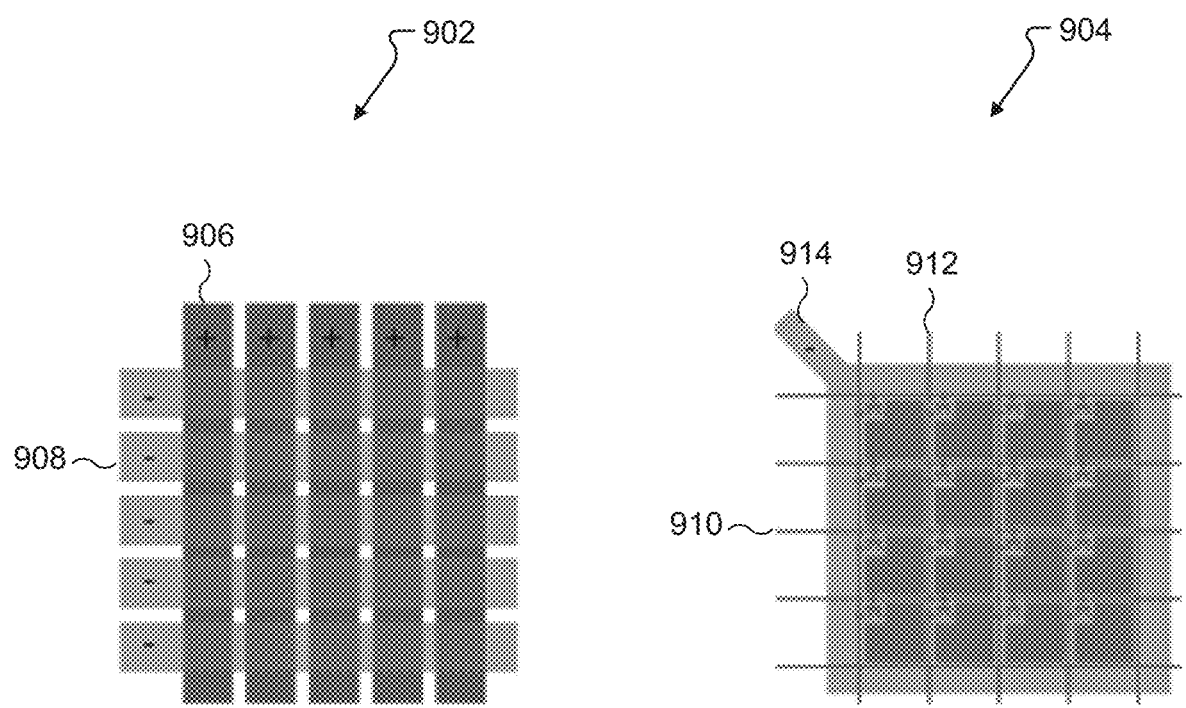
FIG. 9 illustrates example driving structures for a modifiable shader layer according to this disclosure.

FIG. 9 illustrates example driving structures for a modifiable shader layer according to this disclosure. In some embodiments, the driving structures of FIG. 9 drive the modifiable shader layer 102 of FIGS. 1A and 1B or the modifiable shader layer 265 of FIG. 2. FIG. 9 includes examples of a passive matrix driver 902, and of an active matrix driver 904. The drivers 902 and 904 are formed of a transparent material (for example, ITO) on a glass substrate, and can be used to address specific portions (e.g., pixels) of a modifiable shader layer which they are driving, which accordingly can allow portions of the modifiable shader layer to be made transparent while other portions are made opaque or partially opaque.

The passive matrix driver 902 makes use of a grid of conductive metal to form and activate pixels. On the first glass or plastic substrate of the modifiable shader layer, the passive matrix driver 902 includes columns 906 of transparent conductive material. On the second glass or plastic substrate of the modifiable shader layer, the passive matrix driver 902 includes rows 908 of transparent conductive material. To turn on a pixel of the passive matrix driver 902, an electric charge is supplied to a column 906 and a ground is connected to a row 908 such that the column 906 and row 908 intersect at the desired pixel, delivering voltage to create an electric field between the column 906 and row 908 at that pixel.

Referring now to the active matrix driver 904, on the first glass or plastic substrate of the modifiable shader layer, the active matrix driver 904 includes a thin film transistor arranged in a matrix (e.g., grid) of capacitors and transistors that are connected by scan lines (or rows) 910 and data lines (or columns) 912. On the second glass or plastic substrate of the modifiable shader layer, a common electrode 914 is formed. To activate a particular pixel of the active matrix 904, the appropriate row 910 is turned on while a signal is transmitted along the correct column 912. The capacitor at the pixel formed at the intersection of the row 910 and column 912 can hold its charge for one refresh cycle, if the active matrix driver 904 is used in a modifiable shader layer that refreshes.

In some embodiments, driving waveforms are applied to the drivers 902 and 904. Pre-emphasis of the signal, or specific proprietary pulse shape designs, may be used to speed up the time to transition from translucent to transparent in some modifiable shader layers described above. Modifiable shader layers may be refreshed at a slower overall pace using a series of pulses to clear pixels to reduce ghosting effects in passively-driven modifiable shader layers.

In some embodiments, active driving is needed to maintain the state of a modifiable shader layer described above. In these embodiments, special driving waveforms, which differ from the driving waveforms used to transition states, can be used to maintain the state of the modifiable shader layer. These driving waveforms differ from normal driving waveforms in that they are intended to keep the display in a particular state rather than to change a state of pixels (or of the entire modifiable shader layer, in a case where matrix driving is not used).

Figure 10:
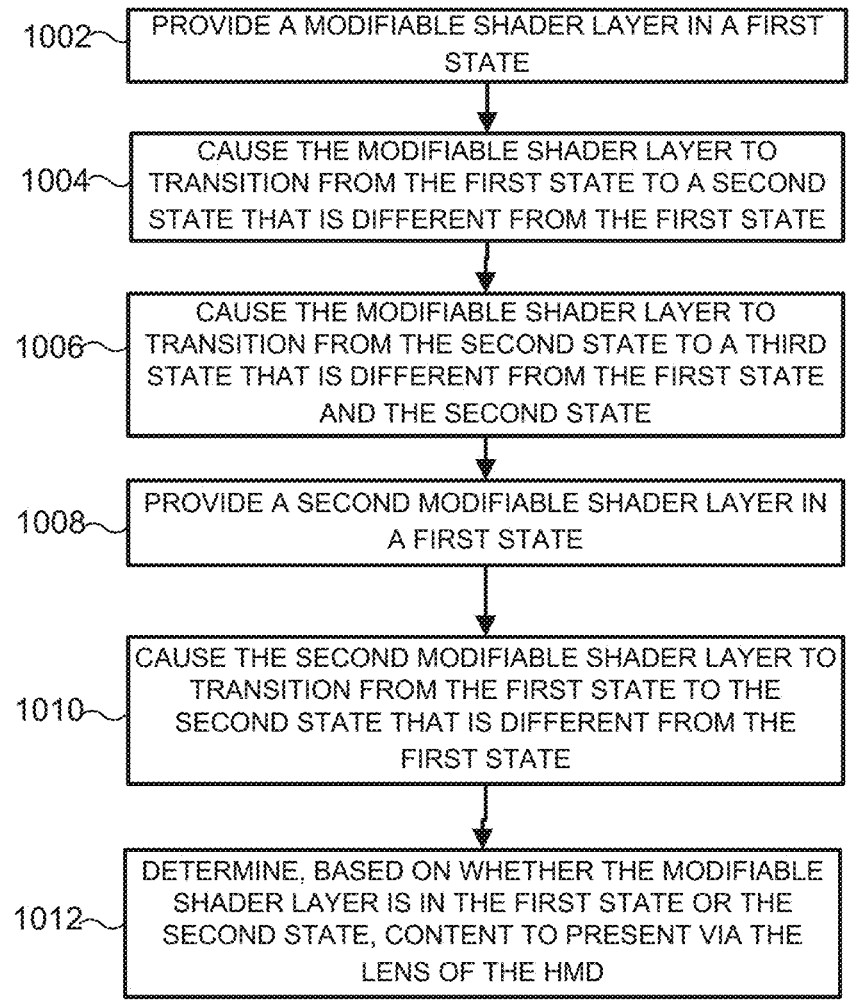
FIG. 10 illustrates an example method of using a modifiable shader layer according to this disclosure.

FIG. 10 illustrates an example method of using a modifiable shader layer according to this disclosure. In some embodiments, the method can be used with the modifiable shader layer 102 of FIGS. 1A and 1B or the modifiable shader layer 265 of FIG. 2. In some embodiments, the method can be performed by an electronic device such as HMD of FIGS. 1A and 1B or electronic device 200 of FIG. 2. For convenience, the method will be considered to be performed by a processor 240 of the electronic device of FIG. 2.

Beginning at step 1002, a modifiable shader layer is provided in a first state, for example a transparent state or an opaque state. The modifiable shader layer is associated with a lens of an HMD. For example, the modifiable shader layer can be a backdrop to the lens such that the modifiable shader layer is behind the lens while the user is wearing the HMD.

At step 1004, the processor causes the modifiable shader layer to transition from the first state to a second state that is different from the first state. For example, the second state can be a transparent or opaque state, such that if the modifiable shader layer was provided in a transparent state in step 1002, it transitions to an opaque state in step 1004, or vice versa. In some embodiments, one of the first or second states could be a partially opaque state (for example, when the material that forms the modifiable shader layer is not capable of full opacity). The modifiable shader layer can include a colored dye (such as a black dye) to absorb light in the opaque state. In some embodiments, modifiable shader layer can be formed with LCSMA, LCPC, electrochromic display, or electro-wetting display materials. The LCPC can be a PDLC or a PSLC. In some embodiments, the modifiable shader layer is formed with a photochromatic material.

The transition of step 1004 can be caused by applying an electric field to the modifiable shader layer. For example, when the modifiable shader layer is formed with LCSMA, an AC electric field can be applied with a potential of 70-100 Volts. When transitioning to the opaque state, the AC electric field is applied at 10-50 Hz, and when transitioning to the transparent state, the AC electric field is applied at 1-4 kHz. The electric field can be applied between electrodes on either side of the modifiable shader layer. In some embodiments, causing the transition includes sending a waveform signal to the modifiable shader layer, where the shape of the waveform can be modified to change the speed of transition from the first state to the second state. For example, the signal could include pulses that turn the electric field on and off periodically.

At step 1006, the processor causes the modifiable shader layer to transition from the second state to a third state that is different from the first and second states. For example, the first, second, and third states could be transparent, opaque, and partially opaque (or partially transparent) states. It is understood that when the modifiable shader layer is capable of transitioning to these three states, it can transition through the partially opaque state from either the opaque or transparent states. In some embodiments, the level of opacity of the third state can be controlled by the strength or duration of the electric field applied to the modifiable shader layer.

In some embodiments, at step 1008, a second modifiable shader layer is provided in a first state, and is associated with the lens of the HMD. For example, the second modifiable shader layer can be provided as a backdrop to the first modifiable shader layer, such that the second modifiable shader layer is behind both the first modifiable shader layer and the lens of the HMD when a user is wearing the HMD. Alternatively, the positions of the first and second modifiable shader layer could be switched.

In some embodiments, at step 1010, when the second modifiable shader layer is provided in a first state, the processor causes the second modifiable shader layer to transition from the first state to a second state that is different from the first state. As with the first modifiable shader layer, the first state and second state of the second modifiable shader layer can be transparent and opaque states. In some embodiments, the first modifiable shader layer is formed with LCSMA and the second modifiable shader layer is formed with electrochromic materials. In this case, the second modifiable shader layer may be capable of more thorough opacity than the first modifiable shader layer, and in its opaque state it can provide a darker backdrop for the user of the HMD than the first modifiable shader layer alone.

At step 1012, the processor determines content to present via the lens of the HMD based on the state of the first modifiable shader layer. For example, when the modifiable shader layer is in the opaque state, the processor could determine to display VR applications, and when the modifiable shader layer is in the partially opaque state or the transparent state, the processor could determine to display AR applications. In some embodiments, when a second modifiable shader layer is present, the states of both the first and second modifiable shader layers can be taken into account.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
providing a modifiable shader layer associated with a lens of a head-mountable display (HMD), the modifiable shader layer provided in a first state, the modifiable shader layer including at least one of Liquid Crystal Smectic-A (LCSMA), liquid crystal polymer composites (LCPC), electro-wetting display (EWD), electro-dispersive display (ELDD), or electrochromic display (ECD);
causing the modifiable shader layer to transition from the first state to a second state that is different from the first state, wherein the first state and the second state are one of a transparent state, an opaque state, or a partially opaque state; and
determining, based on the modifiable shader layer being in the opaque state, to execute a virtual reality (VR) application and display content generated by the VR application via the lens of the HMD, or determining, based on the modifiable shader layer being in the transparent state or the partially opaque state, to execute an augmented reality (AR) application and display content generated by the AR application via the lens of the HMD.

2. The method of claim 1, wherein causing the modifiable shader layer to transition from the first state to the second state includes applying an electric field to the modifiable shader layer.

3. The method of claim 2, wherein:
the modifiable shader layer includes LCSMA,
the electric field is an alternating current (AC) electric field,
the AC electric field is associated with a voltage range of 70 Volts to 100 Volts,
the opaque state is associated with the AC electric field being within a frequency range of 10 Hz to 50 Hz, and
the transparent state is associated with the AC electric field being within a frequency range of 1 kHz to 4 kHz.

4. The method of claim 1, wherein the modifiable shader layer includes a dye that absorbs light incident on the modifiable shader layer in the opaque state.

5. The method of claim 1, further comprising:
providing a second modifiable shader layer associated with the lens of the HMD, the second modifiable shader layer including an electrochromic material; and
causing the second modifiable shader layer to transition from the first state to the second state that is different from the first state,
wherein determining to execute the VR application or the AR application is determined based on whether the second modifiable shader layer is in the first state or the second state.

6. The method of claim 1, wherein:
the modifiable shader layer is formed based on one or more portions, and
causing the modifiable shader layer to transition from the first state to the second state includes causing at least one portion of the modifiable shader layer to transition from the first state to the second state.

7. The method of claim 6, wherein causing the at least one portion of the modifiable shader layer to transition from the first state to the second state further includes using an active matrix or a passive matrix to apply an electric field to the at least one portion of the modifiable shader layer.

8. The method of claim 7, wherein the at least one portion of the modifiable shader layer includes at least one pixel that forms the modifiable shader layer.

9. The method of claim 1, wherein causing the modifiable shader layer to transition from the first state to the second state includes sending a signal to the modifiable shader layer, the signal including a waveform that can be modified to change a speed of the transition from the first state to the second state.

10. The method of claim 1, wherein the modifiable shader layer includes LCPC, and wherein the LCPC includes at least one of polymer dispersed liquid crystal (PDLC) or polymer stabilized liquid crystal (PSLC).

11. The method of claim 1, further comprising:
causing the modifiable shader layer to transition from the second state to a third state that is different from the first state and the second state, wherein the first state and the second state are one of the transparent state or the opaque state, and wherein the third state is the partially opaque state.

12. The method of claim 1, wherein the modifiable shader layer is photochromatic.

13. A head-mountable display (HMD) comprising:
a lens of the HMD;
a modifiable shader layer associated with the lens of the HMD, the modifiable shader layer provided in a first state, the modifiable shader layer including at least one of Liquid Crystal Smectic-A (LCSMA), liquid crystal polymer composites (LCPC), electro-wetting display (EWD), electro-dispersive display (ELDD), or electrochromic display (ECD); and
a processor configured to:
cause the modifiable shader layer to transition from the first state to a second state that is different from the first state, wherein the first state and the second state are one of a transparent state, an opaque state, or a partially opaque state; and
determine, based on the modifiable shader layer being in the opaque state, to execute a virtual reality (VR) application and display content generated by the VR application via the lens of the HMD, or determining, based on the modifiable shader layer being in the transparent state or the partially opaque state, to execute an augmented reality (AR) application and display content generated by the AR application via the lens of the HMD.

14. The HMD of claim 13, wherein the processor is configured to cause the modifiable shader layer to transition from the first state to the second state by applying an electric field to the modifiable shader layer.

15. The HMD of claim 13, further comprising:
a second modifiable shader layer associated with the lens of the HMD, the second modifiable shader layer including an electrochromic material,
wherein the processor is further configured to:
cause the second modifiable shader layer to transition from the first state to the second state that is different from the first state, and
determine to execute the VR application or the AR application based on whether the second modifiable shader layer is in the first state or the second state.

16. The HMD of claim 13, wherein:
the modifiable shader layer is formed based on one or more portions, and
the processor causes the modifiable shader layer to transition from the first state to the second state by causing at least one portion of the modifiable shader layer to transition from the first state to the second state.

17. A non-transitory computer readable medium embodying a computer program, the computer program comprising computer readable program code that when executed causes at least one processor to:
cause a modifiable shader layer provided in a first state and associated with a lens of a head-mountable display (HMD) to transition from the first state to a second state that is different from the first state, the modifiable shader layer including at least one of Liquid Crystal Smectic-A (LCSMA), liquid crystal polymer composites (LCPC), electro-wetting display (EWD), electro-dispersive display (ELDD), or electrochromic display (ECD), wherein the first state and the second state are one of a transparent state, an opaque state, or a partially opaque state; and
determine, based on the modifiable shader layer being in the opaque state, to execute a virtual reality (VR) application and display content generated by the VR application via the lens of the HMD, or determining, based on the modifiable shader layer being in the transparent state or the partially opaque state, to execute an augmented reality (AR) application and display content generated by the AR application via the lens of the HMD.

18. The non-transitory computer readable medium of claim 17, wherein the computer readable program code when executed further causes the at least one processor to cause the modifiable shader layer to transition from the first state to the second state by applying an electric field to the modifiable shader layer.

19. The non-transitory computer readable medium of claim 17, wherein the computer readable program code when executed further causes the at least one processor to:
cause a second modifiable shader layer associated with the lens of the HMD to transition from the first state to the second state that is different from the first state, the second modifiable shader layer including an electrochromic material; and
determine to execute the VR application or the AR application based on whether the second modifiable shader layer is in the first state or the second state.

20. The non-transitory computer readable medium of claim 17, wherein:
the modifiable shader layer is formed based on one or more portions, and
the computer readable program code when executed further causes the at least one processor to cause at least one portion of the modifiable shader layer to transition from the first state to the second state.

* * * * *